United States Patent [19]

Rosenberg

[11] Patent Number: 4,632,757

[45] Date of Patent: Dec. 30, 1986

[54] FILTERS CLEANABLE BY REVERSE FLUSHING

[76] Inventor: Peretz Rosenberg, Moshav Beit Shearim, Israel

[21] Appl. No.: 779,922

[22] Filed: Sep. 25, 1985

[30] Foreign Application Priority Data

Oct. 4, 1984 [IL] Israel .................................. 73165

[51] Int. Cl.⁴ .......................................... B01D 29/38
[52] U.S. Cl. ................................. 210/411; 210/414; 210/425; 210/427
[58] Field of Search ............... 210/407, 408, 409, 413, 210/414, 425, 427, 411

[56] References Cited

U.S. PATENT DOCUMENTS 4,328,098  5/1982  Benson ................................. 210/414

Primary Examiner—Frank Sever
Attorney, Agent, or Firm—Benjamin J. Barish

[57] ABSTRACT

A filter capable of being cleaned by reverse flushing, comprises a housing including a fluid inlet, a fluid outlet, a flushing outlet, and a filter body disposed within the housing. The housing includes blocking members disposed on opposite faces of the filter body and axially spaced from each other to define a reverse flushing passageway from the fluid inlet to the flushing outlet through the portion of the filter body between the axially-spaced blocking members. At least one of the blocking members is movable axially of the filter body to reversely-flush the complete length of the filter body.

17 Claims, 4 Drawing Figures

FILTERS CLEANABLE BY REVERSE FLUSHING

BACKGROUND OF THE INVENTION

The present invention relates to filters, and particularly to filters capable of being cleaned by reverse flushing.

Many types of filters cleanable by reverse flushing are known. One type includes an arrangement for connecting the pressurized fluid line to the filter outlet to cause the fluid to flow in the reverse direction through the filter and thereby to flush out the dirt particles. Another type includes a cleaning nozzle connectable to a flushing outlet controlled by a valve which is opened in order to cause a reverse flow of the fluid through the filter body and cleaning nozzle to the flushing outlet. A still further known type includes an arrangement for connecting a separate flushing fluid to the filter outlet for flushing out the dirt particles accumulated within the filter.

An object of the present invention is to provide a new type of reversely-flushable filter.

SUMMARY OF THE INVENTION

According to a broad aspect of the present invention, there is provided a filter capable of being cleaned by reverse flushing comprising a housing including a fluid inlet, a fluid outlet, a flushing outlet, and a filter body disposed within the housing; characterized in that the housing includes blocking members disposed on opposite faces of the filter body and axially-spaced from each other to define a reverse-flushing passageway from the fluid inlet to the flushing outlet through the portion of the filter body between the axially-spaced blocking members, at least one of the blocking members being movable axially of the filter body to reversely-flush the complete length of the filter body.

In the preferred embodiments of the invention described below, the filter body is of cylindrical configuration and is spaced from the inner face of the housing to define a central passageway through the filter body in which one of the blocking members is disposed, and an annular passageway between the filter body and the housing in which the other blocking member is disposed.

The described filters further include a valve for controlling the fluid flow through the flushing outlet such that: when the valve is closed, a normal filtering operation is performed wherein the fluid flow is from the housing inlet in the forward direction through the filter body and out through the fluid outlet; and when the valve is open, a cleaning operation is performed wherein the fluid flow is from the housing inlet, in the forward direction through a portion of the filter body, and then in the reverse direction through another portion of the filter body between the blocking members and out through the flushing outlet, thereby reverse flushing the portion of the filter body between the blocking members.

The foregoing features, as well as other features of the invention to be described below, enable filters to be constructed at low cost and having a high self-cleaning efficiency.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
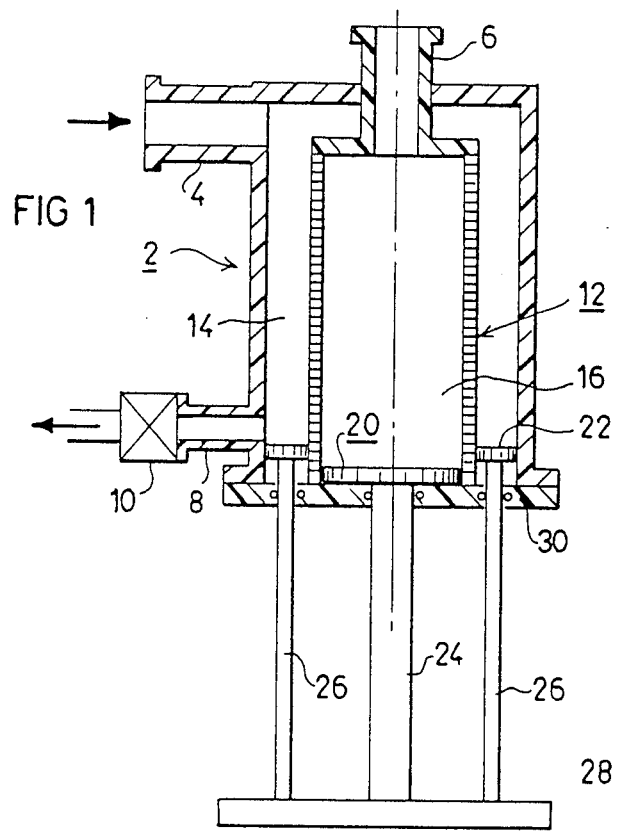
FIG. 1 is a longitudinal sectional view illustrating one form of filter constructed in accordance with the present invention, the filter being shown in its condition during a normal filtering operation.
Figure 2:
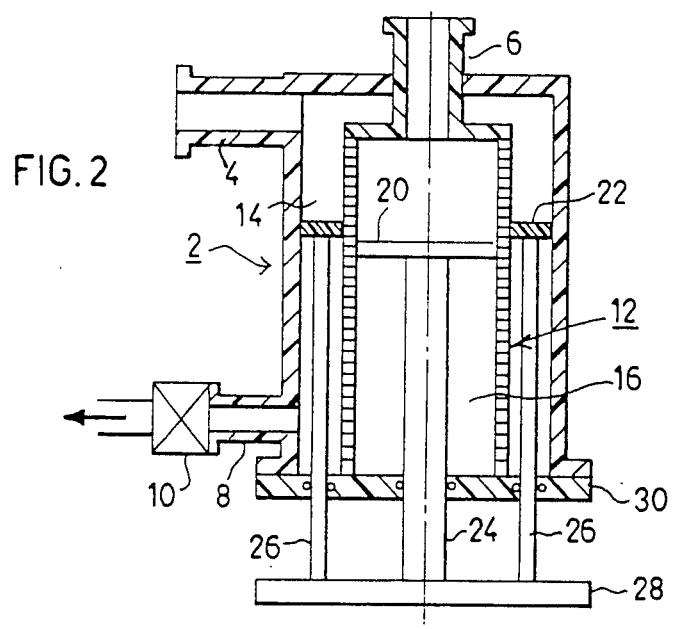
FIG. 2 is a view corresponding to that of FIG. 1 but illustrating the filter during a self-flushing cleaning operation.

The filter illustrated in FIGS. 1 and 2 is particularly useful for a water irrigation system in order to separate solid particles from the water before reaching the irrigating devices, such as sprinklers or drip irrigation emitters, which may be clogged by such particles. The filter comprises a housing, generally designated 2, including a fluid inlet 4 for connection to the upstream irrigation pipe, a fluid outlet 6 for connection to the downstream irrigation pipe, and a flushing outlet 8 connectable via a valve 10 to the atmosphere for flushing dirt particles accumulated within the filter.

Disposed within housing 2 is a filter body, generally designated 12, of cylindrical construction and spaced from the inner face of the housing. The fluid inlet 4 communicates with the outer face of filter body 12, which outer face thereby serves as the upstream surface of the filter body on which the separated dirt particles accumulate. The water passes through the filter body 12 in the radially-inward direction, so that the water reaching the inner face of the filter body and passing through outlet 6 is relatively free of dirt particles.

Filter body 12 is of cylindrical configuration; so is the main section of housing 2 within which the filter body is disposed. The filter body is spaced from the inner face of housing 2, so as to define an outer annular passageway 14 between it and the inner face of housing 2, which passageway communicates with the inlet 4. The cylindrical filter body 12 also includes a central passageway 16, communicating with outlet 6.

Disposed within central passageway 16 is a central blocking member 20 of disc configuration. Another blocking member 22 of annular configuration is disposed within the annular passageway 14 between the filter body 12 and housing 2. Both blocking members 20 and 22 disposed adjacent opposite faces of filter body 12, provide a small clearance with respect to the filter body and housing 2 so as to permit both blocking members to move relatively freely within their passageways even when they are filled with water or other fluid. Blocking members 20 and 22 are connected by stems 24 and 26, respectively, to a common operator or handle 28 externally of the filter housing 2, the stems passing through sealed apertures in an end wall 30 of the housing.

The annular blocking member 14 is fixed, by handle 28 and stems 26 and 24, so as to be axially-spaced with respect to the central blocking member 20. Both blocking members may thus be moved together, while in this fixed axially-spaced relationship, back and forth in order to clean the filter body by reverse flushing the portion 12' of filter body 12 between the axially-spaced blocking members 20, 22.

The filter illustrated in FIGS. 1 and 2 operates as follows:

With reference first to FIG. 1 which illustrates the condition of the filter during a normal filtering operation, it will be seen that in this condition, both blocking members 20 and 22 are in their extended positions adjacent to end wall 30 of housing 2. Thus, the complete filter body 12 is effective to remove dirt particles from the water applied via inlet 4 and passing in the radially-inward direction through the filter body to the outlet 6. During this normal filtering operation valve 10 is closed, so that no flow is produced through the flushing outlet 8.

Whenever the filter body 12 is to be reversely flushed, valve 10 is opened. This produces a flow through the flushing outlet 8. In addition, handle 28 is reciprocated back and forth to move the two blocking members 20, 22 axially through the complete length of the filter body 12.

FIG. 2 illustrates blocking members 20, 22 in an intermediate position with respect to the filter body during this reciprocation of handle 28. Thus, as shown in FIG. 2, the water introduced via inlet 4 passes from annular chamber 14 in the forward direction through the upper portion of filter body 12 between outlet 6 and the annular blocking member 22, then in the reverse direction through the portion 12' of the filter body between the annular blocking member 22 and the central blocking member 20 back into the annular chamber 14 on the opposite side of the annular blocking member, and then out through the flushing outlet 8. This flow is produced because opening valve 10 connects flushing outlet 8 to the atmosphere, whereas the clean water outlet 6 is under the pressure of the downstream water line. If there is no pressure in the downstream water line, it would be necessary to provide the clean water outlet 6 with a valve which is closed during the reverse flushing operation.

It will thus be seen that during this reverse flushing operation the water entering the central chamber 16 from the portion of filter body 12 between the annular blocking member 22 and the outlet 6, flows in the reverse direction back through portion 12' of the filter body between the axially-spaced blocking members 22 and 20. This portion 12' of the filter body is thus reversely flushed of the accumulation of dirt particles on the upstream (outer) surface of the filter body, which dirt particles are removed through flushing outlet 8. By reciprocating handle 28 to move blocking members 20 and 22 back and forth axially along the surface of the filter body, the complete surface of the filter body is thus reversely-flushed of the dirt particles thereon.

When the filter body 12 has thus been cleaned, valve 10 is closed and handle 28 is moved to the extended position illustrated in FIG. 1, thereby conditioning the filter for its normal filtering operation.

Figure 3:
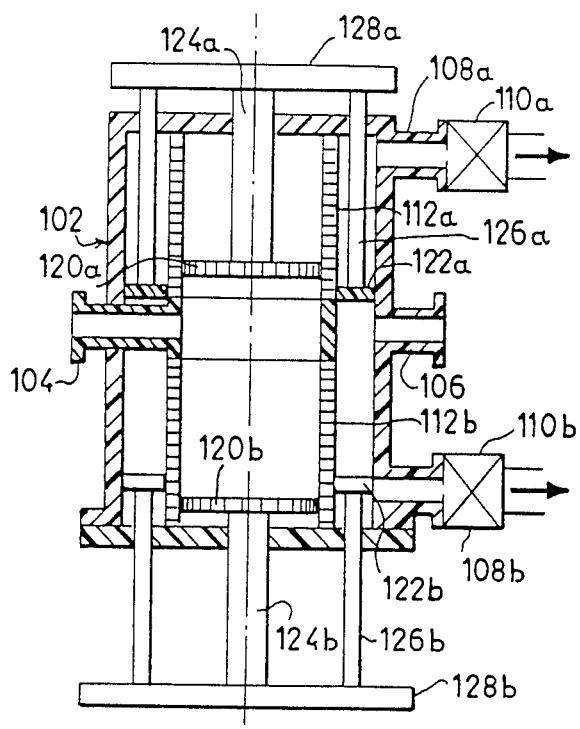
FIGS. 3 and 4 are longitudinal sectional views illustrating two additional forms of filters constructed in acccordance with the present invention.

FIG. 3 illustrates another filter construction including a single housing 102 containing two filter bodies 112a, 112b, each of which may be individually cleaned by reciprocating its respective handle 128a, 128b.

Thus, the filter illustrated in FIG. 3 includes a single inlet 104, a single outlet 106, but two flushing outlets 108a, 108b each controlled by a valve 110a, 110b. Handle 128a is mechanically coupled to a central blocking member 120a and to an annular blocking member 122a via stems 124a and 126a, respectively, which blocking members cooperate with filter body 112a; similarly, handle 128b is mechanically coupled to a central blocking member 120b and an annular blocking member 122b via stems 124b and 126b, respectively, which blocking members cooperate with filter body 112b.

The filter illustrated in FIG. 3 may be operated as follows:

When the complete filter is to be used for a normal filtering operation, both handles 128a, 128b are moved to their fully extended positions as illustrated in FIG. 1, wherein both filter bodies 112a, 112b are effective to filter out the dirt particles in the fluid applied inlet 104, in the same manner as described above with respect to FIG. 1. During such an operation, both valves 110a and 110b are closed, so that all the water applied via inlet 104 and passing through the two filter bodies 112a, 112b, exits from the filter via outlet 106.

If it is desired to use only one filter body for a normal filtering operation, its blocking members are moved to their extended positions, and the blocking members of the other filter body are moved to their retracted positions. FIG. 3 illustrates the filter in the condition wherein filter body 112a is made effective to filter, whereas filter body 112b is ineffective to filter.

Whenever the filter is to be cleaned by reverse flushing, this can be accomplished in two stages, in each of which, one of the two filter bodies 112a, 112b is cleaned.

Thus, to clean the upper filter body 112a, the lower handle 128b is moved to its retracted position as illustrated in FIG. 3, valve 110a is opened (valve 110b remains closed), and handle 128a is reciprocated towards and away from handle 128b. This causes the upper filter body 112a to be reversely-flushed in the same manner as described above with respect to FIGS. 1 and 2, the dirt particles being flushed out through flushing outlet 106. When filter body 112a has been thus cleaned, its valve 110a is closed, handle 128a is moved to the retracted position bringing its blocking members 120a, 122a close to the inlet 104 and outlet 106, and then handle 128b is reciprocated to cause its blocking members 120b, 122b to clean by reverse flushing the lower filter body 112b the dirt particles being flushed out through flushing outlet 108b.

Figure 4:
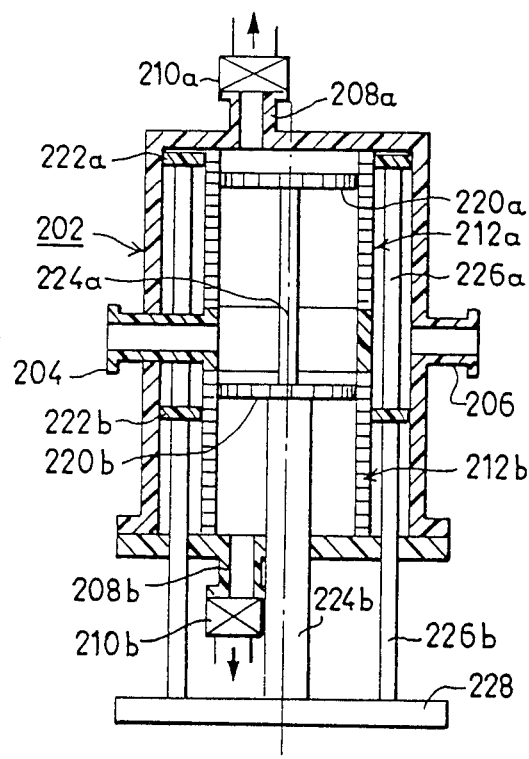

It will be seen that in the filters illustrated in FIGS. 1-3, the fluid inlet (4, 104) and the flushing outlet (8, 108a, 108b) communicate with the annular passageway (e.g. 14 in FIGS. 1, 2) between the filter body and the housing; whereas the fluid outlet (6, 106) communcates with the central passageway (e.g. 16) within the filter body. FIG. 4 illustrates a filter having, among a number of other changes, an opposite arrangement, wherein the fluid inlet and flushing outlet both communicate with the central passageway, and the fluid outlet communicates with the annular passageway. The filter illustrated in FIG. 4 also includes two filter bodies, as in FIG. 3, but in this case all the blocking members cooperable with both filter bodies are coupled to a common handle for operation together, rather than for separate operation as in the FIG. 3 filter.

More particularly, the filter illustrated in FIG. 4 includes a housing 202 having a single fluid inlet 204, a single fluid outlet 206, two flushing outlets 208a, 208b each controlled by a separate valve 210a, 210b and two filter bodies 212a, 212b. The filter in FIG. 4 further includes a central blocking member 220a and annular blocking member 222a cooperable with filter body 212a, and another central blocking member 220b and annular blocking member 222b cooperable with filter body 212b. The two central blocking members 220a, 220b are coupled to the common handle 228 via stems 224a, 224b; and the two annular blocking members 222a, 222b are coupled to the common handle 228 via stems 226a, 226b.

In FIG. 4, the blocking members for each filter body are fixed to the common handle 228 such that when the blocking members for one filter body are in their retracted positions, those for the other filter body are in their extended positions. FIG. 4 illustrates blocking members 220a, 222a for filter body 212a in their extended positions, i.e. remote from the fluid inlet 204 and fluid outlet 206; whereas blocking members 220b, 222b for filter body 212b are shown in their extended positions adjacent to the fluid inlet and outlet.

As clearly seen in FIG. 4, annular blocking member 222a adjacent to the outer face of its filter body 212a is axially displaced with respect to the central blocking member 220a adjacent to the inner face of filter body 212a; and similarly annular blocking member 222b adjacent to the outer face of filter body 212b is axially displaced with respect to central blocking member 220b adjacent to the inner face of filter body 212b. Accordingly, the portions of the filter bodies 212a, 212b between their respective axially-displaced blocking members would be cleaned by reverse flushing in the same manner as described above with respect to FIGS. 1 and 2.

The operation of the filter of FIG. 4 is apparent from the above description. Thus, in the condition illustrated in FIG. 4 and if both valves 210 and 210b are closed, only the upper filter body 212a is effective to filter out the dirt particles in the fluid applied at inlet 204, which fluid leaves the outlet 206. Whenever filter body 212a becomes clogged, handle 228 may be moved downwardly, whereupon filter body 212 will now become effective to filter out the particles in the fluid applied at inlet 204 and leave the filter via outlet 206. Whenever one filter body is to be cleaned, its valve (208a, 208b) is opened, and if both filter bodies are to be cleaned at the same time, both valves are opened. Handle 228 is then reciprocated in order to move the two pairs of blocking members 220a, 222a, and 220b, 222b, back and forth with respect to their filter bodies 212a, 212b, thereby cleaning the filter bodies by reverse flushing the accumulated dirt particles through flushing outlets 208a and 208b.

It will be appreciated that the filters described herein are set forth purely for purposes of example, and that many other variations and applications of the invention can be made. For example, the invention could be applied not only with respect to manually-cleanable filters, but also with respect to automatically-cleanable filters including a sensor, as well-known in the art for sensing the pressure difference on opposite sides of the filter body and for actuating a drive for reciprocating the blocking members in order to effect a self-flushing operation when the large pressure difference indicates an undue accumulation of dirt on the filter body. The filter body can be of any known type, including a stack of filter discs, a cylindrical screen, or the like. Further, instead of coupling both blocking members for movement together by a common operator, such as a handle, one of the blocking members (e.g. the central blocking member) may be fixed at one end of the filter body, and the other blocking member (e.g. the annular blocking member) may be reciprocated back and forth, which arrangement will also produce a reverse flushing of the portion of the filter body between the two blocking members.

Many other variations, modifications and applications of the invention will be apparent.

What is claimed is:

1. A filter capable of being cleaned by reverse flushing, comprising a housing including a fluid inlet, a fluid outlet, a flushing outlet, and a filter body disposed within the housing; characterized in that said housing includes blocking members disposed on opposite faces of said filter body and axially spaced from each other to define a reverse flushing passageway from the fluid inlet to the flushing outlet through the portion of the filter body between said axially-spaced blocking members, at least one of said blocking members being movable axially of the filter body to reverse flush the complete length of the filter body.

2. The filter according to claim 1, wherein both of the blocking members are movable axially of the filter body while in axially-spaced relationship with each other.

3. The filter according to claim 2, wherein both of the blocking members are coupled so as to move together axially of the filter body.

4. The filter according to claim 1, wherein the filter body is of cylindrical configuration and is spaced from the inner face of the housing to define a central passageway through the filter body in which one of the blocking members is disposed, and an annular passageway between the filter body and the housing in which the other blocking member is disposed.

5. The filter according to claim 1, further including a valve for controlling the fluid flow through the flushing outlet such that: when the valve is closed, a normal filtering operation is peformed wherein the fluid flow is from the housing inlet in the forward direction through the filter body and out through the fluid outlet; and when said valve is open, a cleaning operation is performed wherein the fluid flow is from the housing inlet in the forward direction through a portion of the filter body, and then in the reverse direction through another portion of the filter body between said blocking members, and out through the flushing outlet, thereby reverse flushing the portion of the filter body between said blocking members.

6. A filter capable of being cleaned by reverse flushing, comprising:
   a housing having a fluid inlet, a fluid outlet, and a flushing outlet;
   a cylindrical filter body disposed within the housing and spaced from its inner face to define a central passageway through the filter body, and an annular passageway between the filter body and the inner face of the housing;
   a central blocking member located within said central passageway to block the fluid flow therethrough;
   an annular blocking member located within said annular passageway to block the fluid flow therethrough;
   said annular blocking member being spaced axially of the central blocking member and being movable axially of the filter body;
   and a valve controlling the flow through said flushing outlet such that:
   when said valve is closed, a normal filtering operation is performed wherein the fluid flow is from the housing inlet, in the forward direction through the filter body, and out through the housing outlet;

and when said valve is open, a cleaning operation is performed wherein the fluid flow is from the housing inlet, in the forward direction through a portion of the filter body, then in the reverse direction through another portion of the filter body between said blocking members, and out through the flushing outlet, thereby reverse flushing the portion of the filter body between said blocking members.

7. The filter according to claim 6, wherein said central blocking member is also movable axially of the filter body.

8. The filter according to claim 7, wherein said central blocking member is secured in axially-spaced relationship to said annular blocking member such that in a self-cleaning operation both the blocking members move together in axially-spaced relationship while the portion of the filter body between said blocking members is reversely flushed.

9. The filter according to claim 8, wherein said two blocking members are secured to a common operator extending externally of the housing.

10. The filter according to claim 6, wherein said fluid inlet and said flushing outlet both communicate with said annular passageway, and said fluid outlet communicates with said central passageway.

11. The filter according to claim 6, wherein said fluid inlet and said flushing outlet both communicate with said central passageway, and said fluid outlet communicates with said annular passageway.

12. The filter according to claim 6, wherein said housing includes: two cylindrical filter bodies in axially aligned relationship to each other; a single fluid inlet; a single fluid outlet; two central blocking members one for each filter body; two annular blocking members, one for each filter body; and two flushing outlet, one for each filter body.

13. The filter according to claim 12, wherein the central blocking member and the annular blocking member of one filter body are coupled to move together in axially-spaced relationship, and the central blocking member and the annular blocking member of the filter body are coupled to move together in axially-spaced relationship independently of the blocking members of said one filter body.

14. The filter according to claim 12, wherein both central blocking members and annular blocking members are all coupled to move together with the central blocking member and annular member of one filter body in axially-spaced relationship to each other, and the central blocking member and annular blocking member of the filter body also in axially-spaced relationship with respect to each other.

15. A filter capable of being cleaned by reverse flushing, comprising a fluid inlet, a fluid outlet, a flushing outlet and a filter body disposed within the housing;
said housing including blocking members disposed on opposite faces of said filter body and axially spaced from each other to define a reverse flushing passageway from the fluid inlet to the flushing outlet through the portion of the filter body between said axially-spaced blocking members, both of said blocking members being movable axially of the filter body while in axially-spaced relationship with each other to reversely-flush the complete length of the filter body.

16. The filter according to claim 15, wherein the filter body is of cylindrical configuration and is spaced from the inner face of housing to define a central passageway through the filter body in which one of the blocking members is disposed, and an annular passageway between the filter body and the housing in which the other blocking member is disposed.

17. The filter according to claim 16, further including a valve for controlling the fluid flow through the flushing outlet such that: when the valve is closed, a normal filtering operation is peformed wherein the fluid flow is from the housing inlet in the forward direction through the filter body and out through the fluid outlet; and when said valve is open, a cleaning operation is performed wherein the fluid flow is from the housing inlet in the forward direction through a portion of the filter body, and then in the reverse direction through another portion of the filter body between said blocking members, and out through the flushing outlet, thereby reverse flushing the portion of the filter body between said blocking members.

* * * * *